July 7, 1953  L. R. CRARY  2,644,563
OVERLOAD PROTECTIVE SYSTEM
Filed March 10, 1950
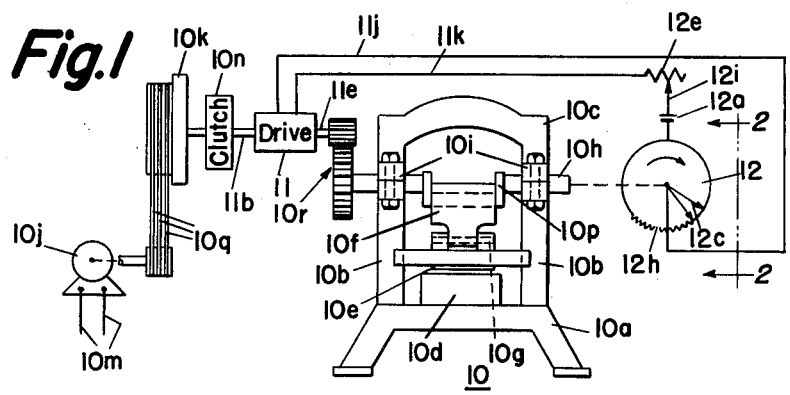
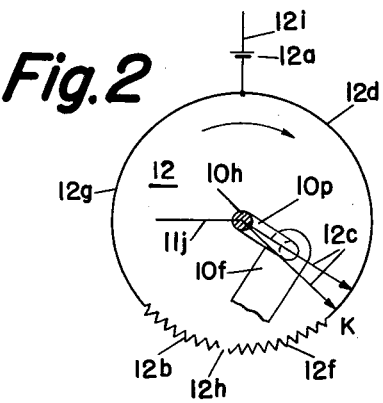
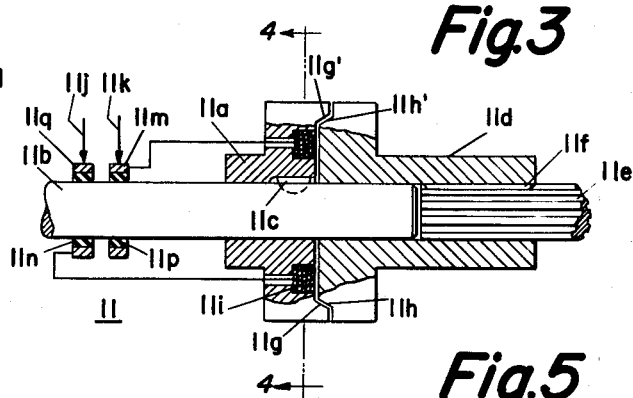
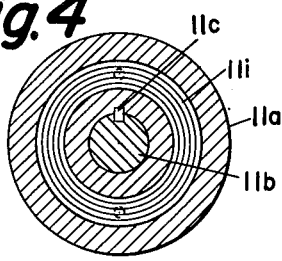
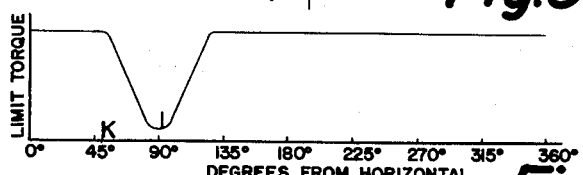
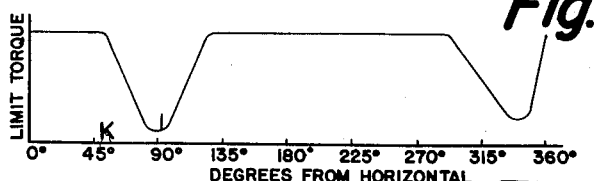
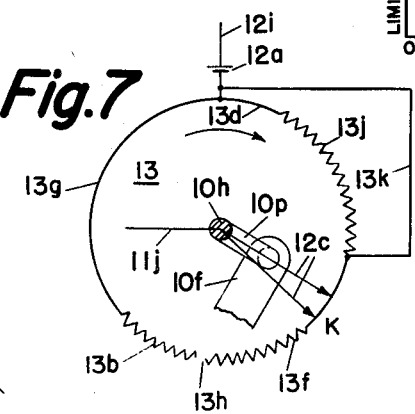
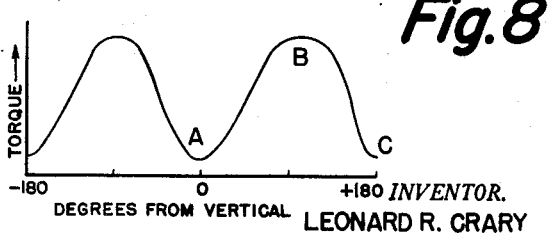
INVENTOR.
LEONARD R. CRARY
BY
Woodcock and Phelan
ATTORNEYS Patented July 7, 1953

2,644,563

UNITED STATES PATENT OFFICE 2,644,563

OVERLOAD PROTECTIVE SYSTEM

Leonard R. Crary, Philadelphia, Pa.

Application March 10, 1950, Serial No. 148,986

6 Claims. (Cl. 192—150)

This invention relates to protective devices for machinery and it relates particularly to torque-limiting power transmissions for machines, such as punch presses, whose overload characteristics vary during the operating cycle of the machine.

It has heretofore been recognized that the power requirements of punch presses and similar machines vary during their operating stroke and efforts have been made to limit the power transmission in accordance with the power requirements of the press as described, for example, in United States Patent No. 1,814,891. Such efforts have not generally been successful, however, for a number of reasons among which is the indefinite character of the load imposed on a punch press. If the torque is limited to that necessary to carry the ordinary load, objectionable work interruption will result from frequent moderate overloads that might not cause damage to the punch press. On the other hand, if torque limitation is at a sufficiently high level to carry normal overloads, breakage of the punch press may ensue due primarily to the difficulty in fixing definitely the maximum load requirements.

In accordance with the invention, and as an object thereof, the torque supplied to a punch press or similar machine is limited during its operating cycle to values somewhat less than the probable breaking torque of the machine rather than in accordance with its probable load. This probable breaking torque of a machine can be known definitely since it depends upon only the strength of the materials of which the machine is made and not upon the kind of work the machine is called upon to do. An important advantage of this type of protection is the elimination of unnecessary work interruptions due to unnecessary limiting of the torque supplied to the punch press at some parts of its cycle.

A further object of the invention is to protect punch presses and like machines from breakage without unnecessarily limiting the torque supplied thereto by momentum, thereby avoiding unnecessary work interruption. This object is achieved in one respect by providing a torque-limiting coupling, or drive, at a point in the power transmission system between the crankshaft of the punch press and any parts having substantial inertia. It is not enough to disconnect the punch press from its source of power in case of overload if a flywheel having substantial momentum remains connected to the punch press to transmit excessive torque thereto. Thus, in accordance with the invention, the torque-limiting coupling and particularly that portion thereof that is connected directly to the punch press, that is to say, the portion of the coupling that is not connected directly to the power source, is made small and compact in order to minimize its flywheel effect. Such a coupling ordinarily will be interposed between the punch press and the usual clutch mechanism to thus minimize the flywheel effect of that portion of the punch press which must stop abruptly in case of overload. A separate coupling is desirable for the further reason that the requirements for a torque-limiting coupling differ materially from the requirements of the usual punch-press clutch.

Other objects and advantages of the invention will be apparent from the following more detailed description thereof with reference to the accompanying drawings, in which:

Fig. 1 is a diagrammatic view of apparatus embodying the invention;

Fig. 2 is a fragmentary diagrammatic view taken substantially along the line 2—2 in Fig. 1;

Fig. 3 is a fragmentary vertical sectional detail view of a portion of the structure shown in Fig. 1;

Fig. 4 is a sectional view taken along line 4—4 in Fig. 3;

Fig. 5 is a diagram useful in explaining the invention illustrated in Figs. 1 to 4;

Fig. 6 is a diagram useful in explaining a modification of the invention;

Fig. 7 is a fragmentary diagrammatic view illustrating said modification of the structure shown in Fig. 2; and Fig. 8 is a diagram useful in explaining the invention.

Referring to Fig. 1, punch press 10 comprises a pedestal 10a, standards 10b, and cap 10c. A die block 10d is supported by pedestal 10a and, cooperating therewith in the usual way preferably guided by standards 10b, is punch 10e actuated by connecting rod 10f pivotally secured thereto by wrist pin 10g. Connecting rod 10f is actuated in a well-known way by crankshaft 10h rotatably supported in any suitable bearings 10i fixedly secured to standards 10b.

Crankshaft 10h is adapted to be rotated by motor 10j, of any suitable well-known type, through reduction gearing shown by way of example as belt drive 10q and spur gear assembly 10r, although other speed-reducing means may be employed, if desired. Motor 10j is adapted to be operated from any suitable power supply such as electrical power line 10m. Clutch 10n interposed in the mechanical power-transmission system between motor 10j and crankshaft 10h may be of any well-known type such as a pneumatic or magnetic clutch adapted for more or less continuous use in starting and stopping punch press 10 without starting and stopping motor 10j. It will be understood that clutch 10n may be interposed elsewhere in the power transmission system, if desired.

Attempts heretofore have been made to employ clutches such as clutch 10n to protect the punch press from breakage by releasing the clutch under excessive loads. In accordance with the invention, however, a separate overload release device is provided to protect the punch press because, for one reason, clutch 10n being subject to frequent operations is subject to wear which would disturb an overload release adjustment thereof whereas a separate overload release provided in accordance with the invention will operate infrequently and, being free from wear, may be precisely adjusted. Moreover, as will be explained more fully hereinafter, the requirements of an automatic protective release mechanism are different from the requirements of a clutch used to start and stop a punch press.

Drive unit 11, constituting a portion of the system which protects punch press 10 from breakage thereof in case of overload in accordance with the invention, comprises a drive member 11a affixed to shaft 11b as by key 11c, and driven member 11d bearing on shaft 11b and freely slidable longitudinally thereof and of shaft 11e with relative rotation of driven member 11d and shaft 11e prevented by splines 11f.

Drive member 11a and driven member 11d are provided with oblique clutch faces 11g and 11g', and 11h and 11h', respectively, beveled to transmit rotation to driven member 11d when members 11a and 11d are held together by a force applied thereto axially of shaft 11b, but which disengage when such force is inadequate thereby allowing shaft 11e to remain stationary while shaft 11b rotates. This disengagement of members 11a and 11d is accomplished by member 11d moving along splines 11f in response to force exerted thereon by oblique clutch faces 11g and 11h or 11g' and 11h'. It will be understood that if clutch faces 11g and 11h are very nearly parallel to shaft 11b very little force longitudinally of shaft 11b will be required to hold member 11a and 11d together to prevent relative rotation thereof whereas if steps 11g and 11h are more transverse of shaft 11b a greater axial force will be required to transmit torque to member 11d and shaft 11e.

By beveling faces 11g and 11h approximately as shown in Fig. 3 relatively little axial force thereon is required to transmit torque, but a given axial force will transmit only a definite, predetermined torque to member 11d. It will be noted that the maximum torque which can be transmitted to member 11d with a given axial force is determined almost wholly by the angle of faces 11g and 11h and, therefore, is quite definite and dependable. Any frictional opposition to the disengagement of members 11a and 11d will, in a practical case, be small and subject to little variation. Ordinary wear, even over long periods of time, will not appreciably affect the torque at which member 11d will release with a given axial force. This is true because, when friction is small, the force on an oblique face necessarily is perpendicular to that face. In accordance with the invention, one component of that force is limited thereby necessarily limiting all components. In other words, the axial component of the force transmitted from drive member 11a to driven member 11d is limited in order to limit proportionately the torque thus transmitted.

The above-mentioned force longitudinal of shaft 11b, which determines precisely the maximum torque that may be transmitted to member 11d and shaft 11e in case of overload, in a preferred embodiment of the invention, is produced by the magnetic field due to current flowing in coil 11i. Thus the aforesaid maximum torque may be adjusted merely by adjusting the current through coil 11i. Inasmuch as coil 11i rotates during operation of punch press 10, electrical connection thereto from conductors 11j and 11k is made through slip rings 11q and 11m, respectively, fixedly secured to shaft 11b by insulators 11n and 11p in any suitable well-known manner such as by press fitting.

It will be understood that coil 11i might be placed in or on member 11d, if desired, to draw member 11a thereto in which case slip rings 11q and 11m would be affixed to shaft 11e with flexible leads connecting the coil and slip rings. After reading the present description of the invention such construction will be clearly understood by one skilled in the art without further description or illustration thereof.

Electrical current for controllably energizing coil 11i may be supplied by any suitable well-known source, such as battery 12a. It will be understood that members 11a and 11d should be made of steel or some magnetic alloy in order that member 11d will be drawn toward member 11a by the magnetic field from coil 11i, and if an alternating-current source of current should be employed instead of battery 12a members 11a and 11d advantageously may include portions made of suitably laminated silicon steel of a grade commonly used for transformer cores.

When drive unit 11 is called upon to transmit a torque greater than its torque limit as determined by the magnetic pull due to current flowing in coil 11i, oblique faces 11g and 11h will cause members 11a and 11d to separate axially of shaft 11b. This separation will introduce a partial air gap into the magnetic circuit of coil 11i thereby reducing the aforesaid magnetic pull to an extent that may be varied by appropriate design of the electromagnetic system as will be understood by those skilled in the art. Preferably the magnetic pull with members 11a and 11d separated will be reduced to such an extent that these members will not of themselves re-engage, in which case they must be manually reset each time drive unit 11 releases. Alternatively, the magnetic pull with members 11a and 11d separated may be made sufficient to slowly re-engage the members when they are properly oriented, in which case a certain amount of chattering of the drive unit will occur when it is released.

The magnitude of the current through coil 11i, and therefore the torque at which member 11d is released from rotation in case of overload, is controlled by rheostat 12 comprising a stationary resistance element, including resistance portions 12b and 12f and conductor portions 12d and 12g, and a contact 12c rotatably secured to crankshaft 10h in any suitable way. It will be understood by those skilled in the art that the stationary and rotatable portions of rheostat 12 might be interchanged without changing the operation thereof and that, furthermore, either the stationary or rotatable member may be rotated relatively one with the other for adjustment purposes. The following description of a sequence of limit torques is made with reference to a conveniently chosen angular relation of crankshaft 10h and contact 12c, but the same sequence would ensue if both contact 12c and the resistance element were rotated together with respect to crankshaft 10h.

Referring to Figs. 1, 2, and 5, when crank 10p of crankshaft 10h is in its uppermost vertical position contact 12c will engage conductor portion 12d and the full voltage of battery 12a will be effective to produce current in coil 11i and rheostat 12e thereby causing drive unit 11 to transmit its maximum torque to shaft 11e and thence to crankshaft 10h. It is assumed for the present that there will be little need for protection of punch press 10 with crank 10p in this position since punch 10e is then fully raised and it must descend somewhat before danger of breakage of the punch press occurs.

When crank 10p has rotated to its horizontal position contact 12c will still engage conductor portion 12d so that drive unit 11 will transmit its maximum torque as shown on a relative scale in Fig. 5 to 0 degrees from horizontal. In this position crank 10p may be said to have little leverage since little rotary motion of crankshaft 10h will result in a relatively large displacement of punch 10e. Otherwise stated, a large torque applied to crankshaft 10h will result in relatively little force at punch 10e.

For a clearer understanding of the reasons for torque limitations imposed in accordance with the invention, reference is made to Fig. 8 wherein the approximate relative torque required at crankshaft 10h to produce a certain constant thrust at punch 10e is plotted. With crank 10p in its uppermost or lowermost vertical position, indicated at 0 or 180 degrees from vertical, a very small torque thereon theoretically would produce an infinite thrust at punch 10e. Because the punch-press frame yields slightly this great leverage is never attained in practice but a relatively small torque, such as is indicated at A in Fig. 8, will nevertheless produce a substantial force at punch 10e. As crank 10p rotates downward to the horizontal, as indicated at plus 90 degrees from vertical in Fig. 8, its leverage decreases so that a much larger torque, such as is indicated at B, is necessary to produce the same force at punch 10e. Thereafter, and of greater importance because this is the working stroke, as crank 10p rotates downward from the horizontal the torque thereon necessary to produce a given thrust at punch 10e decreases to the value indicated at C.

For reasons beyond the scope of this description, punch presses are actually built to withstand only thrusts of the punch that crankshaft 10h is capable of exceeding during the lower part of its travel, below a certain critical angle of crank 10p. Seemingly it is not feasible to build punch-press frames and other parts that will withstand the great thrust which the crankshafts are capable of applying to them when their leverage is great, near the lowermost position of the cranks. When crank 10p is above this critical angle, up to the horizontal, the crankshaft will not be strong enough in torsion to damage the frame since it has insufficient leverage as indicated by the fact that so much torque is required at point B, Fig. 8, to produce a certain force.

Thus when crank 10p is just above the aforesaid critical angle, where the problem is to protect the machine from torsional failure, drive unit 11 should limit the torque which it will transmit to a constant value since the torsional capabilities of the machine are constant. In other words, the torque required to twist off a shaft or to strip gears does not vary. On the other hand, as crank 10p is rotated downward from the critical angle the problem is to protect the frame, or other parts such as the crankshaft, from damage from the thrust of punch 10e and, therefore, the torque limit of drive unit 11 should gradually decrease because the torque necessary to produce a given thrust decreases to a minimum at the lowermost position of crank 10p.

In agreement with the foregoing discussion the maximum torque which drive unit 11 will transmit as crank 10p rotates downward from its horizontal position should be a constant determined by the torsional strength of the crankshaft, or the rotary members which drive it. This constant torque limit is achieved, in accordance with the invention, since a constant current flows through coil 11i while contact 12c engages conductor portion 12d, the current and hence the magnitude of the constant torque limit being adjustable by rheostat 12e. When crank 10p reaches the aforesaid critical angle, indicated at K in Figs. 2, 5, 6, and 7, at which danger of torsional failure becomes subordinate to the danger of failure of the punch-press frame, or other members, due to the thrust of punch 10e, the torque limit of drive unit 11 is gradually reduced by adding resistance portion 12f gradually to the circuit to reduce the current flowing through coil 11i.

Referring to Fig. 2, the aforesaid critical angle of crank 10p is such that contact 12c leaves conductor portion 12d and engages resistance portion 12f at the critical angle. As crank 10p continues to rotate to its lowermost position where its leverage is a maximum resistance portion 12f will all be inserted in the circuit which includes battery 12a and coil 11i so that the current through the coil, and hence the torque limit of drive unit 11, will be a minimum as required to protect the punch press from excessive thrust of punch 10e. As crank 10p continues to rotate punch 10e will be raised through its upstroke where little danger of breakage ordinarily occurs and accordingly full torque is provided as contact 12c moves across resistance portion 12b to conductor portion 12g.

To avoid continuously short-circuiting resistance portions 12f and 12b, a small gap 12h is left therebetween. However, it is not desired that the circuit including battery 12a and coil 11i shall be interrupted as contact 12c passes gap 12h, since such interruption would release drive unit 11 and the punch press would stop. To prevent such interruption contact 12c is made sufficiently wide to span gap 12h or, alternatively, it may be bifurcated, as shown schematically in the drawings, with two portions separated sufficiently to span the gap 12h. As will be clearly understood by those skilled in the art, the effect of such widening of contact 12c, or its bifurcation, in addition to the desired effect of spanning gap 12h, will be merely to short-circuit a short section of resistance portion 12f. If this effect is objectionable it may be minimized by making gap 12h short and contact 12c correspondingly narrow, or resistance portion 12f may be made correspondingly longer in the direction of rotation of contact 12c. Resistance portions 12f and 12b may be tapered in a well-known way to bring about any desired pattern of torque variation.

Referring to Fig. 5, the torque from 0 to the aforesaid critical angle is limited to a constant value by adjustment of rheostat 12e, this value of torque being that above which danger of failure in torsion of some part of the drive system appears. From the critical angle of crank 10p to its lowermost position, 90 degrees from horizontal, the torque limit of drive unit 11 is gradually decreased by rotation of contact 12c thereby gradually interposing resistance portion 12f in the circuit of coil 11i to gradually decrease the current flowing therethrough. Thereafter the torque limit of drive unit 11 will return to its aforesaid constant value when contact 12c engages conductor portion 12g.

Shortly after crank 10p passes its lowermost position contact 12c momentarily engages both of resistance portions 12b and 12f so that parallel paths through these resistances are provided for current from battery 12a thereby momentarily doubling the current and doubling the limit torque of drive unit 11. Inasmuch as this increase in limit torque occurs at the beginning of the upstroke of punch 10e, it is improbable that any breakage of the punch press therefrom will occur. As will readily be understood by those skilled in the art, in some applications resistance portion 12b may be eliminated, conductor portions 12g being extended in place thereof, so that the limit torque of the machine will be increased abruptly to its maximum value at the beginning of the upstroke of punch 10e. Ordinarily, however, resistance portion 12b may have about the same resistance as resistance portion 12f to produce the variation in limit torque shown in Fig. 5.

In the operation of certain machines, such for example as a double acting punch press wherein the work piece is successively engaged by a plurality of punch elements, it is desirable to decrease the limit torque of the drive unit at more than one place in the operating cycle of the machine. For convenience suppose that, in a double-acting toggle press the toggle acts slightly before the crank reaches its horizontal position and that thereafter the crank-actuated punch operates. Such double-acting toggle presses are well known and need not be described further herein. In Fig. 6 the desired pattern of limit torque is illustrated, the decrease in limit torque at 90 degrees from horizontal corresponding to that shown in Fig. 5 and serving to protect the punch press from the great thrust on punch 10e made possible by the great leverage of crank 10p near the bottom of its stroke. The second decrease in limit torque shown in Fig. 6 at about 330 degrees from horizontal, or otherwise stated slightly above the horizontal position of crank 10p, serves to protect the punch press from damage due to the thrust of a toggle-actuated punch element, not shown.

To provide the limit-torque pattern shown in Fig. 6 rheostat 13, shown in Fig. 7, is substituted for rheostat 12 shown in Fig. 2. Referring to Fig. 7, when crank 10p has started downward and the toggle action is beginning, contact 12c engages resistance portion 13j which is short circuited by conductor 13k. As contact 12c moves toward the middle of resistance portion 13j, resistance gradually is introduced into the circuit including battery 12a and coil 11i progressively to reduce the limit torque of drive unit 11. As contact 12c passes the middle of resistance portion 13j, corresponding to about 330 degrees from horizontal in Fig. 6, it approaches conductor 13k gradually reducing to zero the aforesaid resistance in the circuit including battery 12a and coil 11i thereby increasing to its maximum, constant value the limit torque of drive unit 11. As crank 10p passes its horizontal position the operation of the system is exactly like that previously described with reference to rheostat 12 until contact 12c again engages resistance portion 13j. It will readily be understood by those skilled in the art that other resistance portions similar to resistance portion 13j short circuited by conductor 13k may be interposed in conductor portions 13d or 13g to decrease the limit torque of drive unit 11 at other places in the operating cycle of the machine, if desired.

While preferred embodiments of the invention have been described it will be understood that modifications thereof may be made within the spirit and scope of the invention as set forth in the appended claims.

What is claimed is:

1. In a system for protecting from damage due to overload a power-driven machine having the characteristic of being susceptible to such damage only at driving torques above a limit which changes through recurring cycles of operation of the machine, said torque limit being substantially constant during a certain portion of said cycles, the combination which comprises an electric drive unit for transmitting to said machine torque less than an adjustable torque limit determined by the magnitude of an electric current supplied to said unit, said unit being incapable of transmitting to said machine torque greater than said adjustable limit, and means for recurrently adjusting said current concurrently with said cycles, said means being adapted and arranged to adjust said current to maintain said adjustable torque limit substantially at said driving torque limit throughout said portion of said cycles, said means comprising a rheostat including relatively movable contact and resistance members, one of said members being driven relative to the other in synchronism with said machine, said resistance member including a constant current conducting portion for maintaining constant said adjustable torque limit during said portion of said cycles and a progressively decreasing resistance portion for progressively decreasing said adjustable torque limit during other portions of said cycles.

2. In a system for protecting from damage due to overload a power-driven machine having the characteristic of being susceptible to such damage only at driving torques above a limit which changes through recurring cycles of operation of the machine, the combination which comprises an electric drive unit for transmitting to said machine torque less than an adjustable torque limit determined by the magnitude of an electric current supplied to said unit, said unit being incapable of transmitting to said machine torque greater than said adjustable limit, and means for recurrently adjusting said current concurrently with said cycles, said means being adapted and arranged to adjust said current to maintain said adjustable torque limit substantially at said driving torque limit throughout certain portions of said cycles, said means comprising a rheostat including relatively movable contact and resistance members, one of said members being driven relative to the other in synchronism with said machine, said drive unit comprising a pair of engageable clutch elements having oblique substantially frictionless clutch faces for transmission therebetween of force directed only substantially perpendicular to said faces, said faces being so disposed that said force includes a rotary component and an axial component tending to separate and disengage said elements, and an electromagnet for opposing by an adjustable force said separation of said elements to adjust the magnitude of said axial force component required to disengage said elements thereby adjustably limiting the torque transmittable by said drive, said electromagnet being adapted and arranged to apply said opposing force in accordance with the magnitude of said electric current.

3. In a system for protecting from damage due to overload a power driven machine having the characteristic of being susceptible to such damage only at driving torques above a torque limit which changes during the working stroke of a cycle of operation of the machine, and wherein the torque limit is constant and then progressively decreases during the working stroke of the cycle, the combination which comprises an electric drive unit for transmitting to said machine torque less than a torque limit determined by the magnitude of an electric current supplied to said unit, said unit being incapable of transmitting to said machine torque greater than said torque limit, and means for maintaining the current to said unit constant during a portion of the working stroke to a predetermined point and then progressively decreasing the current for the remaining portion of the working stroke, said means comprising a rheostat including relatively movable contact and resistance members, one of said members being driven relative to the other in synchronism with said machine, said resistance member including a contact portion for maintaining constant the current during the portion of the working stroke to said predetermined point and a progressively increasing resistance portion for decreasing the current during the remaining portion of the working stroke.

4. In a system of the type described in claim 3 wherein the resistance member of said rheostat includes a progressively decreasing resistance portion connected to said first resistance portion and said conducting portion for progressively increasing the current to said unit during a portion of the non-working stroke of said cycle.

5. In a system for protecting from damage due to overload a power driven machine having the characteristic of being susceptible to such damage only at driving torques above a torque limit which changes during the working stroke of a cycle of operation of the machine, and wherein the torque limit is constant and then progressively decreases during the working stroke of the cycle, the combination which comprises an electric drive unit for transmitting to said machine torque less than a torque limit determined by the magnitude of an electric current supplied to said unit, said unit being incapable of transmitting to said machine torque greater than said torque limit, and means for maintaining the current to said unit constant during a portion of the working stroke to a predetermined point and then progressively decreasing the current for the remaining portion of the working stroke, said means comprising a current flow controlling device including an element operated in synchronism with said machine to deliver current to said electrical drive unit at a constant rate during that portion of the working stroke to said predetermined point and to deliver current at a progressively decreasing rate during the remaining portion of said working stroke.

6. In a system for protecting from damage due to overload a power driven machine having the characteristic of being susceptible to such damage only at driving torques above a torque limit which changes during the working stroke of a cycle of operation of the machine, and wherein the torque limit is constant and then progressively decreases during the working stroke of the cycle, the combination which comprises an electric drive unit for transmitting to said machine torque less than a torque limit determined by the magnitude of an electric current supplied to said unit, said unit being incapable of transmitting to said machine torque greater than said torque limit, and means for maintaining the current to said unit constant during a portion of the working stroke to a predetermined point and then progressively decreasing the current for the remaining portion of the working stroke, said means comprising a current flow controlling device including a current controlling element and a current transfer element, one of said elements being driven relative to the other in synchronism with said machine, said current controlling element cooperating with said current transfer element to deliver current to said electrical drive unit at a constant rate during that portion of the working stroke to said predetermined point and to deliver current at a progressively decreasing rate during the remaining portion of said working stroke.

LEONARD R. CRARY.

References Cited in the file of this patent

UNITED STATES PATENTS

| Number | Name | Date |
| --- | --- | --- |
| 1,138,647 | Eckmann et al. | May 11, 1915 |
| 1,297,236 | Peiler | Mar. 11, 1919 |
| 1,327,506 | Walker | Jan. 6, 1920 |
| 1,814,891 | Bing | July 14, 1931 |
| 2,055,723 | Hope | Sept. 29, 1936 |

FOREIGN PATENTS

| Number | Country | Date |
| --- | --- | --- |
| 261,660 | Germany | Feb. 9, 1909 |
| 8,294 | Great Britain | Apr. 6, 1910 |
| 534,086 | France | Mar. 17, 1922 |
| 691,267 | France | Oct. 20, 1930 |